United States Patent
Gavette

(10) Patent No.: US 7,187,691 B2
(45) Date of Patent: Mar. 6, 2007

(54) **SECURING THE CHANNEL FOR A QOS MANAGER IN A CSMA/CA *AD HOC* NETWORK**

(75) Inventor: Sherman Leon Gavette, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 957 days.

(21) Appl. No.: 10/026,592

(22) Filed: Dec. 18, 2001

(65) Prior Publication Data

US 2003/0117984 A1 Jun. 26, 2003

(51) Int. Cl.
*H04L 12/413* (2006.01)

(52) U.S. Cl. .................. 370/445; 370/462; 370/338; 370/328

(58) Field of Classification Search .......... 370/395.21, 370/445, 447, 443, 444
See application file for complete search history.

(56) References Cited

U.S. PATENT DOCUMENTS

| | | | | |
|---|---|---|---|---|
| 5,615,212 A | * | 3/1997 | Ruszczyk et al. ........... | 370/433 |
| 6,567,416 B1 | * | 5/2003 | Chuah ......................... | 370/418 |
| 6,907,044 B1 | * | 6/2005 | Yonge et al. ................ | 370/445 |
| 6,909,723 B1 | * | 6/2005 | Yonge, III et al. .......... | 370/447 |
| 6,987,770 B1 | * | 1/2006 | Yonge, III ................... | 370/401 |
| 7,031,249 B2 | * | 4/2006 | Kowalski ..................... | 370/203 |
| 2001/0048692 A1 | * | 12/2001 | Karner ........................ | 370/442 |

* cited by examiner

*Primary Examiner*—Seema S. Rao
*Assistant Examiner*—Michael J Moore
(74) *Attorney, Agent, or Firm*—Robert D. Varitz, PC

(57) ABSTRACT

A method of securing the channel by a QoS manager in an ad hoc network having a contention protocol including a normal priority resolution period having multiple priority resolution slots therein, wherein the contention protocol includes plural contention state slots, and wherein plural devices contend for transmission time on the network by transmitting priority resolution symbols during a priority resolution period, including defining a QoS manager constructed and arranged to compete with the plural devices on the network; and providing an extended priority resolution slot for transmission of a priority resolution symbol at the end of the normal priority resolution period.

6 Claims, 1 Drawing Sheet

SECURING THE CHANNEL FOR A QOS MANAGER IN A CSMA/CA *AD HOC* NETWORK

FIELD OF THE INVENTION

This invention relates to high quality QoS support for applications having rigorous bandwidth, latency and jitter requirements over a powerline network using a CSMA/CA protocol.

BACKGROUND OF THE INVENTION

To support applications with rigorous QoS requirements in a Collision Sense Multiple Access/Collision Avoidance (CSMA/CA) there must be some sort of control mechanism to insure one or more of the following attributes of a session, (1) availability of adequate bandwidth; (2) low jitter, i.e., ±5 ms; and (3) low latency, i.e., 5 ms nominal, depending upon the needs of the supporting applications.

The problem with providing a control mechanism is that ad hoc networks are basically anarchic: there is no central control, and any program or system attempting to implement a centralized control function will compete with other programs each time the control program attempts to seize the channel and establish a QoS environment.

Having determined that some form of control is desirable to resolve the problem of rigorous QoS, the question becomes one of implementation of control in an ad hoc network, i.e., one with no central control. While there are many issues involved in implementing a control mechanism, the first issue is how to insure that the control mechanism can gain control of the medium in a reliable and timely fashion.

Ad hoc networks generally implement a form of CSMA/CA to allow a device to gain control of the channel. Some networks, e.g., 802.11, allow a QoS Manager, usually identified as a point coordination function (PCF), or a hybrid coordination function (HCF) in 802.11e, to assert control after a shorter interframe gap than that allocated to other devices, thereby insuring that the QoS manager will gain control during the next contention interval. It could be argued that 802.11 is, in its fundamental form, an ad hoc network, termed an independent basic service set (IBSS), which has a distribution/control mechanism, the PCF, overlaid on top of it. When a PCF is present, the network is termed a basic service set (BSS), and is considered an infrastructure network, not an ad hoc network.

Other ad hoc networks, e.g., HomePlug, provide a multi-level priority mechanism so that only those devices asserting the highest active priority level actually contend during the contention interval. In these networks, a QoS manager must compete on an even footing with other devices at the same priority level for control of the channel. HomePlug is a registered trademark of the HomePlug Alliance, a California Corporation.

The problem for a QoS manager is that having to compete on an equal footing can have a serious impact on the levels of latency and jitter that the QoS manager can provide. Depending upon the maximum duration that a device can hold a channel once the device has seized the channel, a QoS manager competing on an equal footing with other devices may have to wait so long before gaining control of the channel that it would completely miss one of the periodic intervals in which it is committed to deliver traffic.

SUMMARY OF THE INVENTION

A method of securing the channel by a QoS manager in an ad hoc network having a contention protocol including a normal priority resolution period having multiple priority resolution slots therein, wherein the contention protocol includes plural contention state slots, and wherein plural devices contend for transmission time on the network by transmitting priority resolution symbols during a priority resolution period, including defining a QoS manager constructed and arranged to compete with the plural devices on the network; and providing an extended priority resolution slot for transmission of a priority resolution symbol at the end of the normal priority resolution period.

It is an object of the invention to provide a control mechanism to insure one or more of the following attributes of a session, depending upon the needs of the supported applications: (1) availability of adequate bandwidth; (2) low jitter; and/or (3) low latency.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

Figure 1:
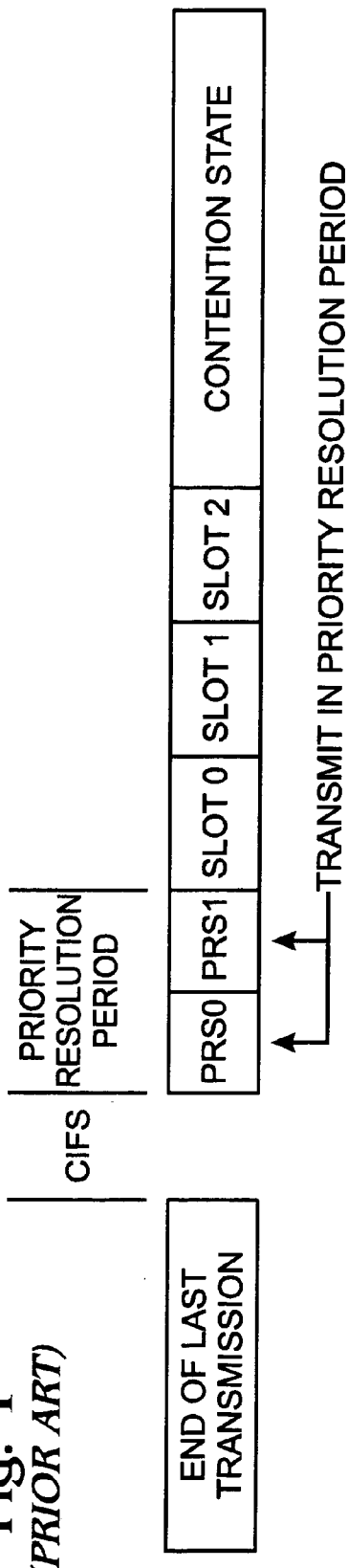
FIG. 1 depicts a prior art contention protocol.

A typical CSMA/CA ad hoc network utilizes a single channel that must be shared by all stations on the physical network. A station wishing to communicate with another station(s) sends packets, referred to as a MAC protocol data units (MPDUs), over the channel. Before a station may send a packet, it must contend for the channel; only the winner of a contention is permitted to transmit.

Timing

Timing on the channel is precise when the channel is active, i.e., when MPDUs are being sent, and there is sufficient information provided by the transmitting device for all other devices to know when the MPDU will complete and contention may begin for the opportunity to transmit the next MPDU.

Commencing with the completion of an MPDU, the following intervals occur in the preferred embodiment of the method of the invention.

TABLE 1

| Interval | Description |
| --- | --- |
| CIFS | Contention Interframe Space |
| PRS0 | Priority Resolution Slot 0 |
| PRS1 | Priority Resolution Slot 1 |
| Contention State | Extends from the end of PRS1 to the beginning of Start Delimiter |
| Start Delimiter | Header portion of the message. Possibly a separate burst |
| MPDU Frame Body | The information content of the message. |
| End Delimiter | Trailer portion of the message. Possibly a separate burst |

TABLE 1-continued

| Interval | Description |
| --- | --- |
| RIFS | Response Interframe Space (occurs only if a response is specified in the Start and End Delimiter) It is shorter than CIFS |
| Response Delimiter | Response Delimiter (occurs only if a response, e.g., ACK/NACK, is specified in the Start and End Delimiter) |

In general, the interval from one CIFS to the next CIFS can vary because 1) the length of a message (and response) may vary, and 2) the duration of the contention state can vary.

Priority Contention

Each station with a message to transmit, will assert the priority of the message during the priority resolution period. The method of the invention supports four levels of priority, called Channel Access Priority (CAP). These CAPs may be mapped to IEEE 802 User Priorities. For example:

TABLE 2

| CAP | IEEE 802.1 User Priority | Application Class |
| --- | --- | --- |
| 3 | 7 | a) Network Control-characterized by a "must get there" requirement to maintain and support the network infrastructure. |
| 3 | 6 | b) "Voice"-characterized by less than 10 ms delay, and hence maximum jitter (one-way transmission through the LAN infrastructure of a single campus). |
| 2 | 5 | c) "Video" or "Audio"-characterized by less than 100 ms delay. |
| 2 | 4 | d) Controlled Load-important business applications subject to some form of "admission control," be that pre-planning of the network requirement at one extreme to bandwidth reservation per flow at the time the flow is started at the other. |
| 1 | 3 | e) Excellent Effort-or "CEO's best effort," the best-effort type services that an information services organization would deliver to its most important customers. |
| 1 | 2 | f) Best Effort-LAN traffic as we know it today. |
| 0 | 0, 1 | g) Background-bulk transfers and other activities that are permitted on the network but that should not impact the use of the network by other users and applications. |

Priority assertion is accomplished as shown in the following table:

TABLE 3

| CAP | PRS0 | PRS1 |
| --- | --- | --- |
| 3 | Assert | Assert |
| 2 | Assert | Listen |
| 1 | Listen | Assert |
| 0 | Listen | Listen |

If a station hears a priority resolution symbol during a priority resolution slot when it is listening, it then recognizes that it has lost the priority contention and will wait until the next priority resolution period. "PRS" is used to designate both a priority resolution slot and a priority resolution symbol. The meaning of PRS is context dependant, and will be readily apparent to one of ordinary skill in the art.

Channel Contention

If a station "wins" the priority contention, then it contends for the channel by selection a random number between 0 and 7 and waiting for that time slot to begin transmitting. If it hears another station begin transmitting prior to its slot, it then recognizes that it has lost the contention and waits until the next priority resolution period.

It is possible that two stations can "win" priority contention and then attempt to begin transmitting in the same time slot. If this occurs, the two transmissions "collide." Each station will detect the collision when it fails to receive a response delimiter at the end of its transmission. Each station detecting a collision will undertake collision recovery, which recovery is beyond the scope of this discussion.

Contention Control and Contention Free Access

Contention occurs for each packet, however, a station with a message that is too big to fit in a single packet must segment that message into packet-sized chunks. In this case, the station is given priority over other stations wishing to send a packet at the same priority, which is called "segment bursting." Other stations with a higher priority message may still preempt the station with the segmented message. Segment bursting is accomplished via a contention control (CC) flag that occurs in each delimiter. If the CC flag is set and the priority of that frame is equal to or higher than the priority of the message the current station wishes to transmit, the current station shall not assert priority during the priority resolution period.

As Table 2 shows, the only applications that can run at CAP=3 are voice transport, e.g., VoIP. The QoS manager of the invention also runs at this priority. A mechanism for contention access is also implemented using the CC flag described above for segment bursting. Contention free access allows a station to transmit several messages without having to contend for the channel in between message segments.

Analysis of HomePlug's QoS Hooks

HomePlug v1.0 provides a completely ad hoc network well suited for best effort networking. This disclosure assumes that CAP=3 is rarely used for network control, because network control is almost nonexistent. Thus, CAP=3 equates to voice traffic, CAP=2 equates to streaming media traffic and CAP=1 equates to best effort. CAP=0 traffic is ignored because it will only be able to run when there is no higher priority traffic and because no applications are expected to use CAP=0. IEEE 802.1 uses its lowest priority as a "penalty box" for applications that abuse their bandwidth guarantee, but since there is no bandwidth guarantee and no network manager, there will be no penalties meted out under a HomePlug protocol.

Priority resolution and contention control provide limited control for QoS. A voice application will always be able to gain control of the medium faster than streaming media applications, and both voice and streaming media will be able to gain control faster than best effort applications.

It is also noteworthy that there is no notion of fairness in HomePlug's prioritization scheme. Sufficient traffic, from one or many devices, at a given priority will always prevent traffic at lower priorities from running. It is conceivable that lower priority traffic could be completely starved and never get to run.

The major concerns from a QoS viewpoint are: (1) latency; (2) jitter—for a QoS application running at a given periodicity, e.g., 10 ms, the amount of jitter which will be seen in the size of periodic intervals is a consideration, however, this may not be a severe problem for larger periodicities, unless the network load is heavy; and (3) bandwidth guarantee—in version 1.0, there is absolutely no way to guarantee bandwidth to a particular application. While a streaming media application will always beat out a best effort application, it must compete with other streaming media applications on a first-come, first served basis for each slot. And it will lose to voice applications every time.

The method of the invention provides a control mechanism constructed to gain control of the medium, or channel, in a reliable and timely fashion. The invention is described in terms of providing an enhancement for a HomePlug type of ad hoc network, but is also applicable to other ad hoc networks using a priority resolution scheme. This enhancement guarantees that a QoS manager will gain control of the channel in a quick, efficient and reliable manner at the first opportunity.

In IEEE Standard 802.11, a standard interframe interval is defined, wherein a distributed (coordination function) interframe space (DIFS)=34 microseconds (ms) in IEEE Standard 802.11a networks. All devices must observe an idle channel of length DIFS prior to transmitting. A special, point (coordination function) interframe space (PIFS) of 25 ms in 802.11a networks is defined for devices, such as a QoS manager, so that such devices can actually gain control of the channel before the standard interframe interval has expired and other devices attempt to transmit.

In HomePlug, there is no special interval. HomePlug relies upon the priority levels and would expect a QoS manager to contend at the highest level wherein the CAP=3. HomePlug does not explicitly provide for a QoS manager; the QoS manager is simply another application to the HomePlug protocol. Unfortunately, HomePlug also allows other devices to contend at this priority level, so the QoS Manager is not assured of gaining the channel. The solution disclosed herein overlays a higher priority, i.e., a priority wherein CAP=7, referred to herein as an extended priority, in the HomePlug priority resolution mechanism. This higher priority will preempt other devices, including legacy devices.

HomePlug has a priority resolution mechanism which allows devices wishing to contend for the channel to assert their priority. A device will assert its priority by transmitting priority resolution symbols (PRSs) during the priority resolution period (PRP), which occurs after a contention interframe space (CIFS), following the end of the last transmission. Only devices asserting at the highest asserted priority will actually contend for the channel. See FIG. 1 and Table 3. The method of the invention preempts slot 0 and uses it as an additional priority resolution slot, PRS3. The CIFS, PRS0, PRS1 and the contention slots in HomePlug each have equal duration.

A device wishing to transmit at CAP=0 will not transmit during the priority resolution period (PRP) but will listen for PRSs. If it detects a PRS in either PRS0 or PRS1, it will 20 recognize that another device wishes to contend at a higher priority (CAP=1, 2 or 3) and it will defer its transmission; i.e., it will not attempt to contend during the current contention period but will wait for the next PRP.

A device wishing to transmit at CAP=1 will listen during PRS0. If it detects a PRS during PRS0, it will recognize that another device wishes to contend at a higher priority (CAP=2 or 3) and will defer its transmission (wait for the next PRP); otherwise it will transmit a PRS during PRS1 and will contend during the contention state. It contends by selecting a random number, n, between 0 and 7. If it does not hear another transmission, and specifically the preamble of a message, in slots 0 thru n−1, it will begin transmitting in slot n. It will have successfully seized the channel unless another device wishing to transmit at CAP=1 also begins transmitting during slot n, in which case they will have collided and will follow the specified procedure for recovering from the collision.

A device wishing to transmit at CAP=2 will transmit a PRS during PRS0 and listen during PRS1. If it detects a PRS during PRS1 it will recognize that another device wishes to contend at a higher priority (CAP=3) and it will defer until the next PRP is specified. A device wishing to contend at CAP=1 will have heard the PRS during PRS1, and will not have asserted during PRS1, having recognized that a higher priority message was waiting. If the device wishing to transmit at CAP=2 does not detect a PRS during PRS1, it will contend for the channel as described above.

A device wishing to transmit at CAP=3 will transmit PRSs during both PRS0 and PRS1 and will then contend for the channel as described above.

A PRP and contention window appear at the beginning of each HomePlug transmission, even if the transmission is part of a segmented message, i.e., segmented messages are used to transport IP packets that are too large to fit in a single HomePlug transmission. This is necessary in case a device has a higher priority message to transmit.

There is another aspect to the priority resolution mechanism: as previously noted, each HomePlug transmission consists of a starting delimiter, a frame body and an ending delimiter. The delimiters carry synchronization information and a small about of information about the transmission, e.g., transmission type, length and whether a response is expected. One bit of information in the delimiter is the contention control bit. If this bit is set to zero, the priority resolution rules above apply; if it is set to one, then only devices wishing to transmit at a higher priority will contend. The purpose of this bit, or contention free flag, is to insure that segmented messages are completed as quickly as possible, i.e., a segmented message is more important than other messages at the same priority. The contention control bit also allows an application to utilize a contention-free period where it will not need to compete with other devices at its own or lower priority. Therefore, if a device has seized the channel at CAP=3 and asserts the contention control bit, no other device, including legacy devices, will contend for the channel until the contention control bit is cleared.

It is assumed that a QoS manager will periodically seize control of the channel and will immediately assert the contention control bit and keep it set to one, thereby establishing a contention free period until all QoS related activity is completed, at which time it would clear the contention control bit and other devices, including legacy devices, would contend for the channel as needed. Thus, it is only at the beginning of this periodic contention free period that the QoS manager is at risk in its attempt to seize the channel.

There are three possible ways in which a QoS manager operating in a priority-based system such as HomePlug can be assured of gaining the channel. While the method of the invention describes the third method, the first two are described to dispel any questions concerning their viability.

Option 1. Be the only one contending at CAP=3. This would have required a HomePlug specification change to reserve CAP=3 for this purpose. Such a change did not occur in HomePlug v1.0, so even if it occurs in a future version of the specification, there are legacy devices which compete at CAP=3. Thus, this is not a viable solution for HomePlug, although it could be a viable solution for other ad hoc networking standards.

Option 2. Compete with other devices for CAP=3 and then attempt to transmit in slot 0, the first time slot, of the contention window; i.e., it would not perform a random backoff before transmitting. This solution has a number of shortcomings: (a) the QoS manager will definitely collide with any CAP=3 device that happened to select slot zero for its backoff. The probability of this event could be a great as 0.125 (1 in 8); (b) the QoS manager will definitely collide with any other QoS manager trying to gain access to the channel; and (c) the QoS manager will not know of collisions until after the message is sent. This wastes time on the channel.

Option 3. Assert PRSs during PRS0, PRS1 and assert an additional PRS, an extended priority resolution slot, which is identical to the PRSs provided in the HomePlug specification, identified as PRS3 in this preferred embodiment, immediately after the currently specified PRS0 and PRS1, in what is depicted as Slot 0 in FIG. 1.

Figure 2:
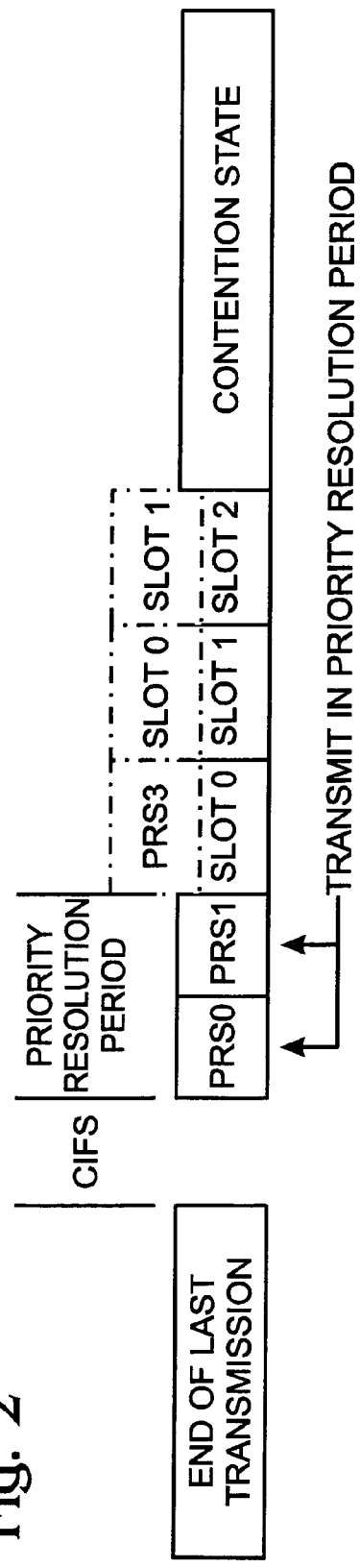
FIG. 2 depicts the contention protocol according to the method of the invention.

Whenever the QoS manager asserts the extended PRS, it has already asserted conventional PRSs during the two priority resolution periods, and it is effectively asserting priority at CAP=7. See FIG. 2. Legacy devices will react in the following manner: devices wanting to contend for the channel at CAP=0, 1 or 2 will see the first two asserted PRSs and will realize that they cannot contend at their lower priority during the current contention window. The third PRS will come at the very beginning of the contention window, during slot 0, and will effectively preempt any legacy devices that are attempting to seize the channel at CAP 3. The legacy device's physical carrier sense will detect the transmission even though it is not expecting a third PRS. This will cause the device's virtual carrier sense to be set to extended interframe space (EIFS), the worst-case time delay for the next priority resolution period window. As with Option 2, there is a finite probability, <=0.125, that the legacy device asserting at CAP=3 will attempt to begin its transmission in slot 0 of the contention window, but this will be detected by the QoS manager much sooner than it would be in Option 2. This ability of the QoS manager to detect a collision in the slot immediately following the extended PRS minimizes channel wastage caused by collisions. Normally, in HomePlug, a collision is inferred from the absence of an ACK to the transmitted message, i.e., the transmitting device does not detect the collision during the collision, as occurs in a CSMA/CD network. The transmitting device cannot detect the collision until it fails to receive an acknowledgement from the intended receiver acknowledging correct receipt of the message.

Once the QoS manager has seized control of the channel, it may retain control of the channel by asserting the contention free flag. The contention free flag appears in all delimiters and if it is set, even other devices at the same priority will defer from contention during the next PRP.

The method of the invention uses an additional PRS to gain control of the channel and force all other users to backoff. A specific embodiment of the method of the invention will now be described in Table 4. After one or more QoS managers have asserted a third PRS, they each utilize their own contention window, which is directly analogous to the standard contention window. Each will identify a slot within the contention window in which to begin transmission according to the following protocol:

TABLE 4

| Old Slot Number | "New" Slot Number | Event |
|---|---|---|
| 0 | PRS3 | QoS Manager(s) assert an additional PRS. A legacy device asserting at CAP = 3 might also begin transmitting in old slot 0. |
| 1 | 0 | QoS Manager does not transmit. The QoS Manager "listens" for Physical Carrier Sense. If a legacy device began transmitting in old slot 0, the preamble to its message will continue through this slot and will be detected by the QoS Manager. The QoS Manager will infer that it did not gain control of the channel and will defer until the next PRP. This occurs only at the beginning of the QoS Manager's contention free period of control. |
| 2 | 1 | If a QoS Manager is active, i.e., it is currently functioning as a QoS Manager, it knows that it is the "controlling" QoS Manager and it will begin transmitting during slot 1 (old slot 2). |
| 3 . . . | 2 . . . 7 | In the QoS Managers first attempt to become active as a QoS Manager, it randomly selects a value, n, between 2 and 7 inclusive. If it does not detect a transmission prior to its selected slot n, it will begin transmitting in that slot. Otherwise, it will back off until the next Priority Resolution window. If it detects a transmission beginning in Slot 1 thru Slot n-1, it will infer that there is another QoS Manager active and will defer to it. |

Thus, a method for securing the channel for a QoS manager in a CSMA/CA ad hoc network has been disclosed. It will be appreciated that further variations and modifications thereof may be made within the scope of the invention as defined in the appended claims.

I claim:

1. A method of securing a channel by a QoS manager in an ad hoc network, wherein the ad hoc network is HomePlug, having a contention protocol including a normal priority resolution period having multiple priority resolution slots therein, wherein the contention protocol includes plural contention state slots, and wherein plural devices contend for transmission time on the network by transmitting priority resolution symbols during a priority resolution period, comprising:

defining a QoS manager constructed and arranged to compete with the plural devices on the network; and providing an extended priority resolution slot for transmission of a priority resolution symbol at the end of the normal priority resolution period, including preempting a contention state slot and providing a third priority resolution slot, PRS3, by preempting contention state slot 0 to secure the channel for traffic from a device asserting a highest priority resolution symbol; and transmitting the highest priority resolution symbol within the third priority resolution slot.

2. The method of claim 1 wherein the QoS manager retains the channel by asserting a contention free flag.

3. A method of securing a channel by a QoS manager in an ad hoc network, wherein the ad hoc network is HomePlug, having a contention protocol including a normal priority resolution period having multiple priority resolution slots therein, wherein the contention protocol includes plural contention state slots, and wherein plural devices contend for transmission time on the network by transmitting priority resolution symbols during a priority resolution period, comprising:

defining a QoS manager constructed and arranged to compete with the plural devices on the network;

providing at least one additional priority resolution period to control the network with the QoS manager; and providing an extended priority resolution slot for transmission of a priority resolution symbol at the end of the normal priority resolution period, including preempting a contention state slot and providing a third priority resolution slot, PRS3, by preempting contention state slot 0 to secure the channel for traffic from a device asserting a highest priority resolution symbol; and transmitting the highest priority resolution symbol within the third priority resolution slot.

4. The method of claim 3 wherein the QoS manager retains the channel by asserting a contention free flag.

5. A method of securing a channel by a QoS manager in an ad hoc network, wherein the ad hoc network is HomePlug, having a contention protocol including a normal priority resolution period having multiple priority resolution slots therein, wherein the contention protocol includes plural contention state slots, and wherein plural devices contend for transmission time on the network by transmitting priority resolution symbols during a priority resolution period, comprising:

defining a QoS manager constructed and arranged to compete with the plural devices on the network; and providing an extended priority resolution slot for transmission of a priority resolution symbol at the end of the normal priority resolution period, including preempting a contention state slot, wherein the QoS manager retains the channel by asserting a contention free flag, and providing a third priority resolution slot, PRS3, by preempting contention state slot 0 to secure the channel for traffic from a device asserting a highest priority resolution symbol; and transmitting the highest priority resolution symbol within the third priority resolution slot.

6. The method of claim 5 which includes providing additional priority resolution periods to control the network with the QoS manager.

* * * * *